(12) United States Patent
Kang

(10) Patent No.: US 9,704,021 B2
(45) Date of Patent: Jul. 11, 2017

(54) VIDEO DISPLAY DEVICE AND OPERATING METHOD THEREOF

(71) Applicant: LG ELECTRONICS INC., Seoul (KR)

(72) Inventor: Kunhwa Kang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/446,887

(22) Filed: Jul. 30, 2014

(65) Prior Publication Data

US 2015/0350586 A1   Dec. 3, 2015

(30) Foreign Application Priority Data

May 29, 2014 (KR) ........................ 10-2014-0065461

(51) Int. Cl.
| | |
|---|---|
| H04N 5/44 | (2011.01) |
| G06K 9/00 | (2006.01) |
| H04N 21/45 | (2011.01) |
| H04N 21/4223 | (2011.01) |
| H04N 21/4415 | (2011.01) |
| H04N 21/442 | (2011.01) |
| H04N 21/454 | (2011.01) |
| H04N 21/475 | (2011.01) |
| H04N 21/482 | (2011.01) |

(Continued)

(52) U.S. Cl.
CPC ..... G06K 9/00288 (2013.01); H04N 21/4223 (2013.01); H04N 21/4415 (2013.01); H04N 21/44222 (2013.01); H04N 21/454 (2013.01); H04N 21/4532 (2013.01); H04N 21/4755 (2013.01); H04N 21/4826 (2013.01); H04N 21/8133 (2013.01); H04N 21/8405 (2013.01); H04N 21/4222 (2013.01); H04N 2005/4428 (2013.01)

(58) Field of Classification Search
CPC ................................................. H04N 21/8405
See application file for complete search history.

(56) References Cited

U.S. PATENT DOCUMENTS

| | | | | |
|---|---|---|---|---|
| 7,131,132 B1 * | 10/2006 | Gehlot | .................... | G06F 21/32 713/168 |
| 7,260,823 B2 * | 8/2007 | Schlack | ................ | G06Q 30/02 348/E7.071 |

(Continued)

FOREIGN PATENT DOCUMENTS

| | | | | | |
|---|---|---|---|---|---|
| CA | WO 2012085900 A1 * | 6/2012 | ......... | G07C 9/00158 |
| EP | 3040882 A1 * | 7/2016 | ......... | G06F 9/00255 |

(Continued)

Primary Examiner — Michael Lee
Assistant Examiner — Humam Satti
(74) Attorney, Agent, or Firm — Birch, Stewart, Kolasch & Birch, LLP

(57) ABSTRACT

Provided is an operating method of an video display device. The method includes: receiving, by the video display device, user input for displaying a favorite channel; obtaining a user's face image of the video display device; determining whether the obtained user's face image is identical to one face image among at least one pre-stored user's face image; when the obtained user's face image is identical to the pre-stored user's face image, searching for a favorite channel matching a favorite keyword corresponding to the pre-stored user's face image; and displaying the found favorite channel.

16 Claims, 10 Drawing Sheets

(51) Int. Cl.
*H04N 21/81* (2011.01)
*H04N 21/8405* (2011.01)
*H04N 21/422* (2011.01)

(56) References Cited

U.S. PATENT DOCUMENTS

| | | | | |
|---|---|---|---|---|
| 7,707,283 | B2 * | 4/2010 | Tsunoda | G06F 17/30702 709/223 |
| 7,987,147 | B2 * | 7/2011 | Ohtani | G06F 3/012 706/45 |
| 8,037,496 | B1 * | 10/2011 | Begeja | G11B 27/034 725/136 |
| 8,539,357 | B2 * | 9/2013 | Hildreth | G06K 9/00335 715/733 |
| 8,791,787 | B2 * | 7/2014 | Hardacker | H04N 5/66 340/5.1 |
| 2002/0087979 | A1 | 7/2002 | Dudkiewicz | G06F 17/30017 725/34 |
| 2002/0157096 | A1 * | 10/2002 | Hane | G06F 17/30828 725/46 |
| 2004/0083490 | A1 * | 4/2004 | Hane | H04H 60/46 725/46 |
| 2004/0177370 | A1 * | 9/2004 | Dudkiewicz | H04N 5/44543 725/46 |
| 2006/0158307 | A1 * | 7/2006 | Lee | G06K 9/00221 340/5.53 |
| 2006/0184800 | A1 * | 8/2006 | Rosenberg | G06F 21/32 713/186 |
| 2007/0016931 | A1 * | 1/2007 | Ichioka | H04N 5/445 725/46 |
| 2007/0126884 | A1 * | 6/2007 | Xu | G06K 9/00221 348/220.1 |
| 2007/0140532 | A1 * | 6/2007 | Goffin | G06K 9/00288 382/118 |
| 2008/0295132 | A1 * | 11/2008 | Icho | H04N 5/44543 725/46 |
| 2008/0307462 | A1 * | 12/2008 | Beetcher | G06F 17/30017 725/53 |
| 2009/0052859 | A1 * | 2/2009 | Greenberger | H04N 9/87 386/213 |
| 2009/0133051 | A1 * | 5/2009 | Hildreth | H04N 5/4403 725/28 |
| 2009/0138805 | A1 * | 5/2009 | Hildreth | G06K 9/00335 715/745 |
| 2010/0122291 | A1 * | 5/2010 | Lee | H04N 5/44543 725/39 |
| 2011/0007141 | A1 * | 1/2011 | Hirano | H04N 5/63 348/61 |
| 2011/0321098 | A1 * | 12/2011 | Bangalore | H04N 21/4884 725/46 |
| 2012/0233552 | A1 * | 9/2012 | Chee | H04L 12/2814 715/745 |
| 2013/0227629 | A1 * | 8/2013 | Yoshizawa | H04N 21/25 725/116 |
| 2013/0321713 | A1 * | 12/2013 | Scavo | H04N 5/60 348/738 |
| 2013/0325655 | A1 * | 12/2013 | Wouhaybi | G06Q 30/0631 705/26.7 |
| 2014/0040370 | A1 * | 2/2014 | Buhr | H04L 67/306 709/204 |
| 2014/0104440 | A1 * | 4/2014 | Sampathkumaran | G06K 9/00288 348/207.1 |
| 2014/0164172 | A1 * | 6/2014 | Du | G06Q 30/0631 705/26.7 |
| 2014/0253700 | A1 * | 9/2014 | Hirano | H04N 5/23219 348/61 |
| 2014/0373082 | A1 * | 12/2014 | Miyazaki | G06F 17/30023 725/110 |
| 2015/0082356 | A1 * | 3/2015 | Naito | G06F 17/30 725/53 |
| 2015/0143394 | A1 * | 5/2015 | Hijikata | H04N 21/45457 725/14 |
| 2015/0382069 | A1 * | 12/2015 | Pearlman | H04N 21/4826 725/46 |

FOREIGN PATENT DOCUMENTS

| | | | | |
|---|---|---|---|---|
| NL | WO 0232136 A2 * | 4/2002 | | G06K 9/00 |
| WO | WO 2007146529 A2 * | 12/2007 | | H04N 5/44543 |
| WO | WO 2007146529 A3 * | 12/2008 | | H04N 5/44543 |
| WO | WO 2012033921 A1 * | 3/2012 | | H04H 60/45 |
| WO | WO 2013059514 A1 * | 4/2013 | | G06F 9/4451 |

* cited by examiner

FIG.11

<NEWS>
Ch. 24 News Today
Ch. 27 World News
Ch. 33 Economy News

<Baseball>
Ch. 55 Lions vs. Twins
Ch. 57 Rays vs. Giants
Ch. 60 Tigers vs. Hawks <Movie>
Oh. 71 LOST
Ch. 73 Once upon a time in Korea
Ch. 90 MONSTER

FIG.12

<Keyword 1>
Ch.a   Ch.b   Ch.c

<Keyword 2>
Ch.d   Ch.e   Ch.f

<Keyword 3>
Ch.g   Ch.h   Ch.i

FIG.15

WWW.freshfood.co.kr
WWW.vegetableshop.com
WWW.burgerqeen.com

Cheeseburger Recipe

1. Mix ground beef with salt and pepper.
2. Form into 1.4 inch-thick patties.
3. Place pickles and cheese on patties.
4. Seal the edges.
5. Broil or grill until done to your liking.
6. Serve on buns.

[VOD]
- Italian Traditional Kitchen
- Noodles Road
- Make a Kimchi

Oliver's Blog

Explore recipes
Genrrero's Fish Spaghetti
How to Cook Steak

What's cooking

| ingredient | Cooking utensils | Recipe |

VIDEO DISPLAY DEVICE AND OPERATING METHOD THEREOF

CROSS-REFERENCE TO RELATED APPLICATIONS

The present application claims priority under 35 U.S.C. 119 and 35 U.S.C. 365 to Korean Patent Application No. 10-2014-0065461 (filed on May 29, 2014), which is hereby incorporated by reference in its entirety.

BACKGROUND

The present disclosure relates to an video display device and an operating method thereof, and more particularly, to an video display device recognizing a user's face and providing a favorite channel corresponding to a favorite keyword of the recognized user and an operating method thereof.

Recently, a digital TV service using a wired or wireless communication network becomes generalized. The digital TV service may provide various services that cannot be provided from an existing analog broadcast service.

For example, in the case of Internet protocol television service (IPTV), one type of the digital TV service, it provides an interaction that allows a user to actively select the type of viewing program and viewing time. The IPTV service may provide various enhanced services on the basis of such an interaction, for example, internet search, home shopping, and online game.

Moreover, although a user of a TV receive various program content through the TV, it is difficult to properly receive a program that the user wants among numerous broadcast channels and contents. Accordingly, an video display device properly providing broadcast channels and contents that a user wants is necessary.

SUMMARY

Embodiments provide an video display device recognizing a user's face and providing a favorite channel matching a favorite keyword that the recognized user inputs.

Embodiments also provide an video display device providing related information on a favorite channel that a user watches.

In one embodiment, provided is an operating method of an video display device. The method includes: receiving, by the video display device, a user input for displaying a favorite channel; obtaining a user's face image of the video display device; determining whether the obtained user's face image is identical to one face image among at least one pre-stored user's face image; when the obtained user's face image is identical to the pre-stored user's face image, searching for a favorite channel matching a favorite keyword corresponding to the pre-stored user's face image; and displaying the found favorite channel.~

In another embodiment, an video display device includes: a display unit; an image acquisition unit obtaining an image for a user of the video display device; and a control unit obtaining a user's face image of the video display device, determining whether the obtained user's face image is identical to one face image among at least one pre-stored user's face image; when the obtained user's face image is identical to the pre-stored user's face image, searching for a favorite channel matching a favorite keyword corresponding to the pre-stored user's face image; and displaying the found favorite channel.

The details of one or more embodiments are set forth in the accompanying drawings and the description below. Other features will be apparent from the description and drawings, and from the claims.

BRIEF DESCRIPTION OF THE DRAWINGS

FIGS. 9 to 11 are views illustrating a favorite channel display according to an embodiment of the present invention.

FIGS. 12 to 14 are views illustrating a favorite channel arrangement according to an embodiment of the present invention.

FIG. 15 is a view illustrating a related information display screen for a favorite channel according to an embodiment of the present invention.

DETAILED DESCRIPTION OF THE EMBODIMENTS

Hereinafter, embodiments of the present invention will be described in more detail with reference to the accompanying drawings. The suffixes "module" and "unit" for components used in the description below are assigned or mixed in consideration of easiness in writing the specification and, do not have distinctive meanings or roles by themselves.

Hereinafter, a screen display controlling method and an video display device using the same according to an embodiment of the present invention are described in detail with reference to the accompanying drawings.

An video display device according to an embodiment of the present invention, for example, as an artificial video display device adding a computer supporting function to a broadcast receiving function, may have an easy-to-use interface such as a handwriting type input device, a touch screen, or a spatial remote controller. Moreover, with the support of a wired or wireless internet function, the video display device may perform a function such as e-mail, web browsing, internet banking, or online game by accessing internet or computers. A standardized general-purpose OS may be used for such various functions.

Accordingly, since various applications are added or deleted freely on a general-purpose OS kernel, an video display device described in the present invention may perform user-friendly various functions. In more detail, the video display device, for example, may be a network TV, an HBBTV, a smart TV, an LED TV, or an OLED TV, and if necessary, may be applied to a smartphone.

Figure 1:
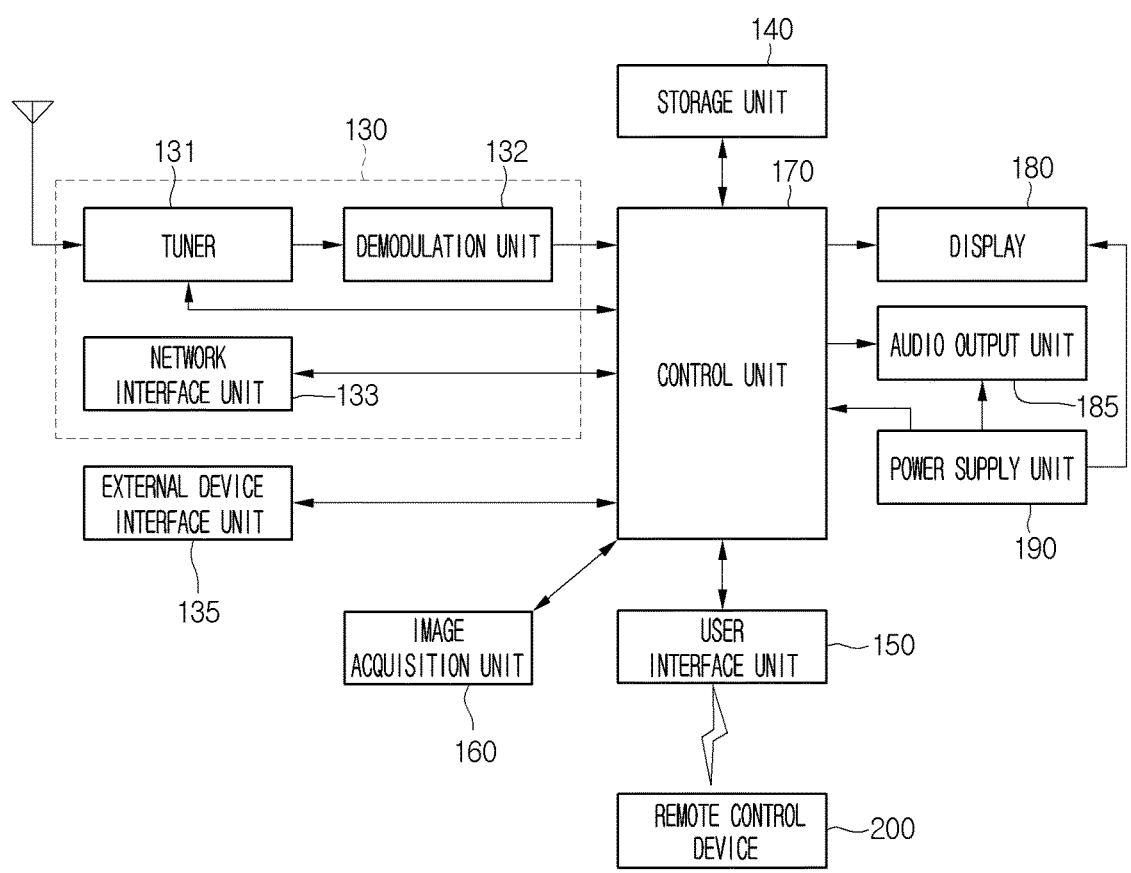
FIG. 1 is a block diagram illustrating a configuration of an video display device according to an embodiment of the present invention.

FIG. 1 is a block diagram illustrating a configuration of an video display device according to an embodiment of the present invention.

Referring to FIG. 1, the video display device 100 may include a broadcast reception unit 130, an external device interface unit 135, a storage unit 140, a user input interface unit 150, an image acquisition unit 160, a control unit 170, a display unit 180, an audio output unit 185, and a power supply unit 190. Moreover, the broadcast reception unit 130 may include a tuner 131, a demodulation unit 132, and a network interface 133.

The external device interface unit 135 may receive an application or an application list in an adjacent external device and may then deliver it to the control unit 170 or the storage unit 140.

The external device interface unit 135 may include a terminal to connect to an external device, so that it may be connected to a connector of the external device.

The external device interface unit 135 may supply a power received from the power supply unit 190 to a connected external device as driving power.

Additionally, the external device interface unit 135 may deliver an operation signal that an external device transmits to the control unit 170.

On the other hand, the external device interface unit 135 may deliver a voice signal that the control unit 170 transmits to an external device.

Moreover, the external device interface unit 135 may include a sensor detecting a connection of an external device, so that it may recognize the connection. The network interface unit 133 may provide an interface to connect the video display device 100 to a wired/wireless network including an internet network. The network interface unit 133 may transmit ore receive data to or from another user or another electronic device via an accessed network or another network linked to an accessed network.

Moreover, the network interface may transmit part of contents data stored in the video display device 100 to a selected user or a selected electronic device among pre-registered other users or other electronic devices.

The network interface unit 1300 may access a predetermined webpage via an accessed network or another network linked to an accessed network. That is, the network interface unit 1300 may transmit or receive data to or from a corresponding server by accessing a predetermined webpage via a network.

Then, the network interface unit 133 may receive contents or data provided from a contents provider or a network operator. That is, the network interface unit 133 may receive contents such as movies, advertisements, games, VOD, and broadcast signals provided from a contents provider or a network provider via a network and information relating thereto.

Additionally, the network interface unit 133 may receive update information and update files of firmware provided from a network operator and may transmit data to an internet or contents provider or a network operator.

The network interface unit 133 may select and receive a desired application among applications open to the public via a network.

The storage unit 140 may store a program for each signal processing and control in the control unit 170 and may store signal processed images, voices, or data signals.

Additionally, the storage unit 140 may perform a function for temporarily storing images, voices or data signals inputted from the external device interface unit 135 or the network interface unit 133, and may store information on a predetermined image through a channel memory function.

The storage unit 140 may store an application or an application list inputted from the external device interface unit 135 or the network interface unit 133.

The video display device 100 may play a contents file (for example, a video file, a still image file, a music file, a document file, and an application file) stored in the storage unit 140 and may then provide it to a user.

The user input interface unit 150 may deliver a signal that a user inputs to the control unit 170 or may deliver a signal from the control unit 170 to a user. For example, the user input interface unit 150 may receive and process a control signal for power on/off, channel selection, and screen setting from a remote control device 200 or may transmit a control signal from the control unit 170 to the remote control device 200 according to various communication methods such as Bluetooth, Ultra Wideband (WB), ZigBee, Radio Frequency (RF) and IR communication methods.

Additionally, the user input interface unit 150 may deliver a control signal inputted from a local key (no shown) such as a power key, a channel key, a volume key, and a setting key to the control unit 170.

The image acquisition unit 160 may obtain an image.

The image acquisition unit 160 may include at least one camera and thus, may obtain an image through an included camera.

Then, the image acquisition unit 160 may deliver the obtained image to the control unit 170.

An image signal image-processed in the control unit 170 may be inputted to the display unit 180 and may then be displayed as an image corresponding to a corresponding image signal. Additionally, an image signal image-processed in the control unit 170 may be inputted to an external output device through the external device interface unit 135.

A voice signal processed in the control unit 170 may be outputted to the audio output unit 185. Additionally, a voice signal processed in the control unit 170 may be inputted to an external device through the external device interface unit 135.

Besides that, the control unit 170 may control overall operations in the video display device 100.

The control unit 170 receives a detection signal for a connection of an external device from the external device interface unit 135 and may then control the power supply unit 190 so that driving power is delivered to an external device connected to the external device interface unit 135.

Furthermore, the control unit 170 may recognize a user's face included in an image on the basis of the image obtained through the image acquisition unit 160. Then, the control unit 170 may perform a search so as to determine whether the user's face included in the obtained image is identical to a face pre-stored in a database.

Moreover, the control unit 170 may control the video display device 100 through a user instruction inputted through the user input interface unit 150 or an internal program, or may download an application or an application list that a user wants into the video display device 100 by accessing a network.

The control unit 170 may allow both information on a channel that a user selects and processed image or voice to be outputted through the display unit 180 or the audio output unit 185.

Moreover, the control unit 170 may allow image signals or voice signals inputted from an external device connected through the external device interface unit 135, for example, a camera or a camcorder, to be outputted through the display unit 180 or the audio output unit 185 in response to an external device image playback instruction received through the user input interface unit 150.

Moreover, the control unit 170 may perform a control on the display unit 180 to display an image and for example, may perform a control to display on the display unit 180 a broadcast image inputted through the tuner 131, an external input image inputted through the external device interface unit 135, an image inputted through the network interface unit 133, or an image stored in the storage unit 140. In this case, an image displayed on the display unit 180 may be a still image or a video, or may be a 2D image or a 3D image.

Additionally, the control unit 170 may perform a control to play contents stored in the video display device 100, received broadcast contents, or external input contents inputted from the outside, and the contents may be in various forms, for example, a broadcast image, an external input image, an audio file, a still image, an accessed web screen, and a document file.

Moreover, the control unit 170 may provide a favorite channel corresponding to a user's keyword on the basis of the keyword that a user inputs. Then, the control unit 170 may provide a favorite channel corresponding to a keyword that a user inputs by recognizing the user's face.

The display unit 180 may convert an image signal processed in the control unit 170, a data signal, an OSD signal, an image signal received from the external device interface unit 135, or a data signal into R, G, and B signals so as to generate a driving signal.

Moreover, the video display device 100 shown in FIG. 1 is just one embodiment, and thus some of the components shown in FIG. 1 may be integrated, added, or omitted according to the specification of the actually implemented video display device 100.

That is, at least two components may be integrated into one component or one component may be divided into more than two components, if necessary. Additionally, a function performed in each block is used to describe an embodiment of the present invention and its specific operation or device does not limit the scope of the present invention.

According to another embodiment of the present invention, unlike those shown in FIG. 1, the video display device 100 may not include the tuner 131 and the demodulation unit 132 and may receive an image through the network interface unit 133 or the external device interface unit 1235 and may then play it.

For example, the video display device 100 may be divided into an image processing device such a settop box for receiving broadcast signals or contents according to various networks and a contents playback device playing contents inputted from the image processing device.

In this case, an image displaying method described below according to an embodiment of the present invention may be performed by one of the image processing device such as a separated settop box or the contents playback device including the display unit 180 and the audio output unit 185 in addition to the video display device 100 described with reference to FIG. 1.

Then, a remote control device according to an embodiment of the present invention will be described with reference to FIGS. 2 to 3.

Figure 2:
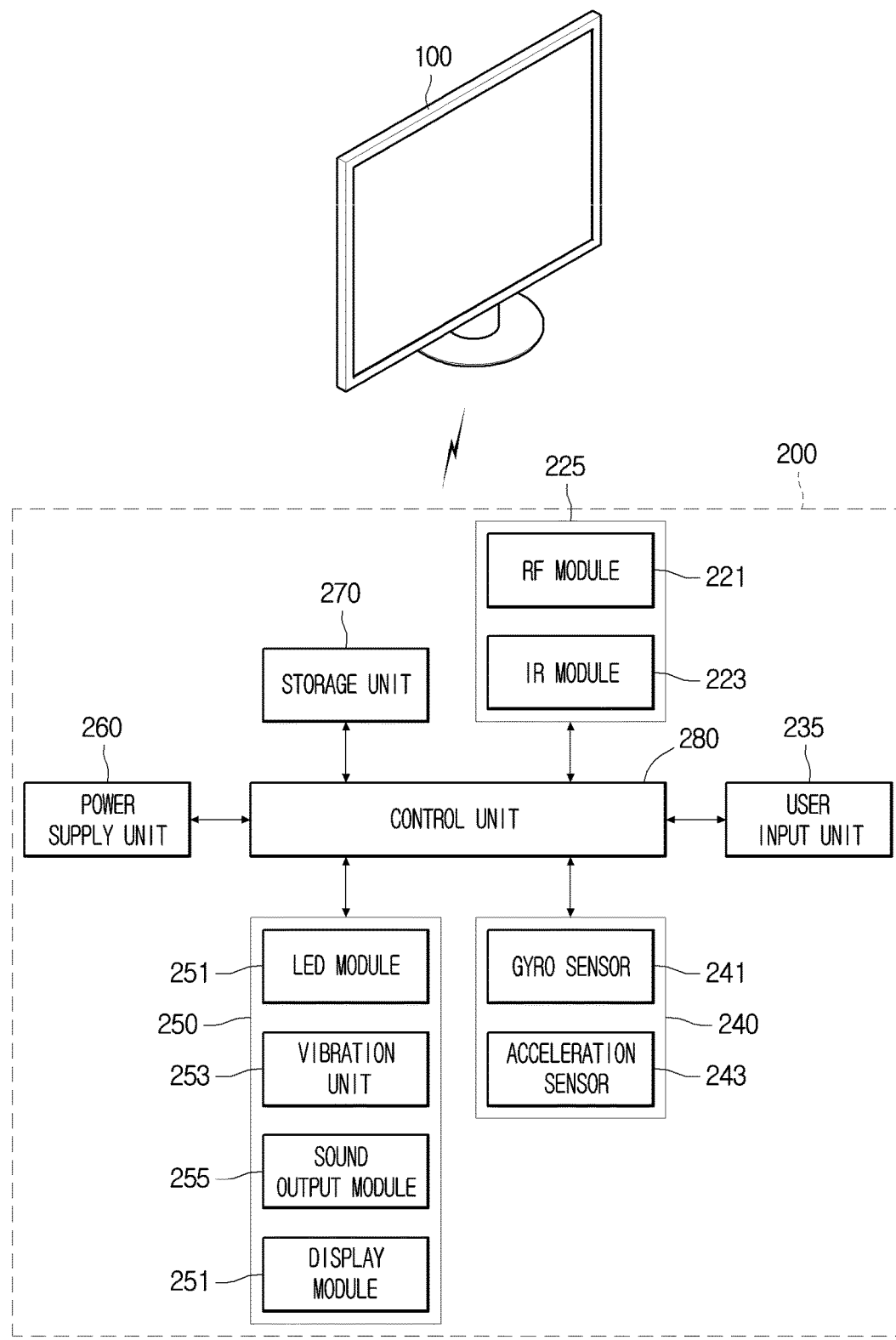
FIG. 2 is a block diagram of a remote control device according to an embodiment of the present invention.
Figure 3:
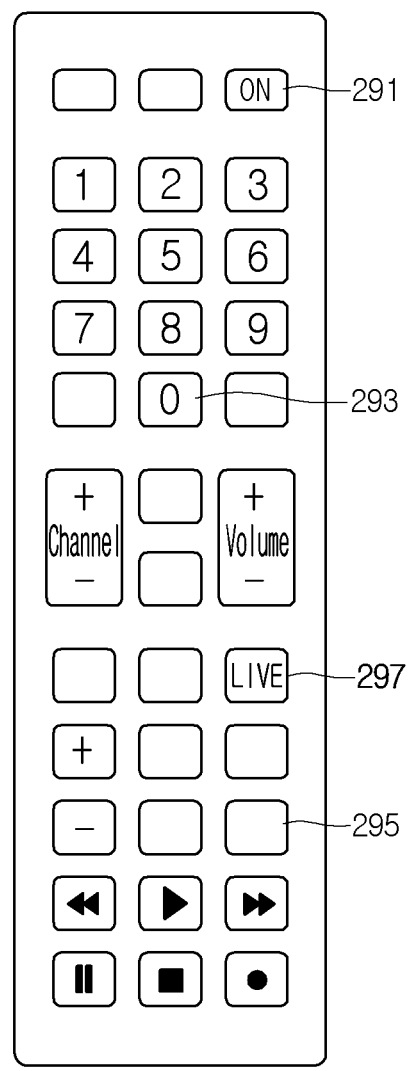
FIG. 3 is a block diagram illustrating an actual configuration of a remote control device according to an embodiment of the present invention.

FIG. 2 is a block diagram of a remote control device according to an embodiment of the present invention and FIG. 3 is a view illustrating actual configuration of a remote control device according to an embodiment of the present invention.

First, referring to FIG. 2, the remote control device 200 may include a wireless communication unit 225, a user input unit 234, a sensing unit 240, an output unit 250, a power supply unit 260, a storage unit 270, and a control unit 290.

Referring to FIG. 2, the wireless communication unit 225 may transmit/receive a signal to/from an arbitrary one among video display devices according to the above-mentioned embodiments of the present invention.

The remote control device 200 may include an RF module 221 transmitting/receiving a signal to/from the video display device 100 according to the RF communication standard and an IR module 223 transmitting/receiving a signal to/from the video display device 100 according to the IR communication standard.

Moreover, the remote control device 200 may transmit a signal containing information on a movement of the remote control device 200 to the video display device 100 through the RF module 221.

Furthermore, the remote control device 200 may receive a signal that the video display device 100 transmits through the RF module 221 and if necessary, may transmit an instruction on power on/off, channel change, and volume change to the video display device 100 through the IR module 223.

The user input unit 235 may be configured with a keypad, a button, a touch pad, or a touch screen. A user may manipulate the user input unit 235 and may input an instruction relating to the video display device 100 to the remote control device 200. When the user input unit 235 is equipped with a hard key button, a user may input an instruction relating to the video display device 100 to the remote control device 200 through a push operation of the hard key button. This will be described with reference to FIG. 3.

Referring to FIG. 3, the remote control device 200 may include a plurality of buttons. The plurality of buttons may include a power button 291, a channel button 293, a favorite channel button 295, and a LIVE button 297.

The power button 291 may be a button for turning on/off the video display device 100.

The channel button 293 may be a button for receiving a broadcast signal of a specific broadcast channel.

The favorite channel button 295 may be a button for displaying a favorite channel.

The LIVE button 297 may be a button for displaying a real-time broadcast program.

Hereinafter, FIG. 2 will be described again.

When the user input unit 235 is equipped with a touch screen, a user may input an instruction relating to the video display device 100 to the remote control device 200 through a soft key touch of the touch screen. Additionally, the user input unit 235 may include various kinds of input means that a user manipulates, for example, a scroll key or a jog key, and this embodiment does not limit the scope of the present invention.

The sensing unit 240 may include a gyro sensor 241 or an acceleration sensor 243 and the gyro sensor 241 may sense information on a movement of the remote control device 200.

For example, the gyro sensor 231 may sense information on a movement of the remote control device 200 on the basis of x, y, and z axes and the acceleration sensor 243 may sense information on the movement speed of the remote control device 200. Moreover, the remote control device 200 may further include a distance measurement sensor and thus may sense a distance to the display unit 180 of the video display device 100.

The output unit 250 may output an image or voice signal corresponding to a manipulation of the user input unit 235 or corresponding to a signal that the video display device 100 transmits. A user may recognize whether the user input unit 235 is manipulated or whether the video display device 100 is controlled through the output unit 250.

For example, the output unit 250 may include an LED module 252 flashing when the user input unit 235 is manipulated or a signal is transmitted from the video display device 100 through the wireless communication module 225, a vibration module 253 generating vibration, a sound output module 255 outputting sound, or a display module 257 outputting an image.

Moreover, the power supply unit 260 supplies power to the remote control device 200 and when the remote control device 200 does not move for a predetermined time, stops power supply, so that power waste may be reduced. The power supply unit 260 may resume the power supply when a predetermined key equipped at the remote control device is manipulated.

The storage unit 270 may store several types of programs and application data necessary for a control or operation of the remote control device 200. If the remote control device 200 transmits a signal wirelessly through the video display device 100 and the RF module 221, the remote control device 200 and the video display device 100 transmit/receive signal through a predetermined frequency band.

The control unit 280 of the remote control device 200 may store information on a frequency band for transmitting/receiving a signal wirelessly to/from the video display device 100 paired with the remote control device 200 and may then refer it.

The control unit 280 may control general matters relating to a control of the remote control device 200. The control unit 280 may transmit to the video display device 100 through the wireless communication unit 225, a signal corresponding to a predetermined key manipulation of the user input unit 235 or a signal corresponding to a movement of the remote control device 200 that the sensing unit 240 senses.

Hereinafter, an operating method of the video display device 100 will be described with reference to FIG. 4.

Figure 4:
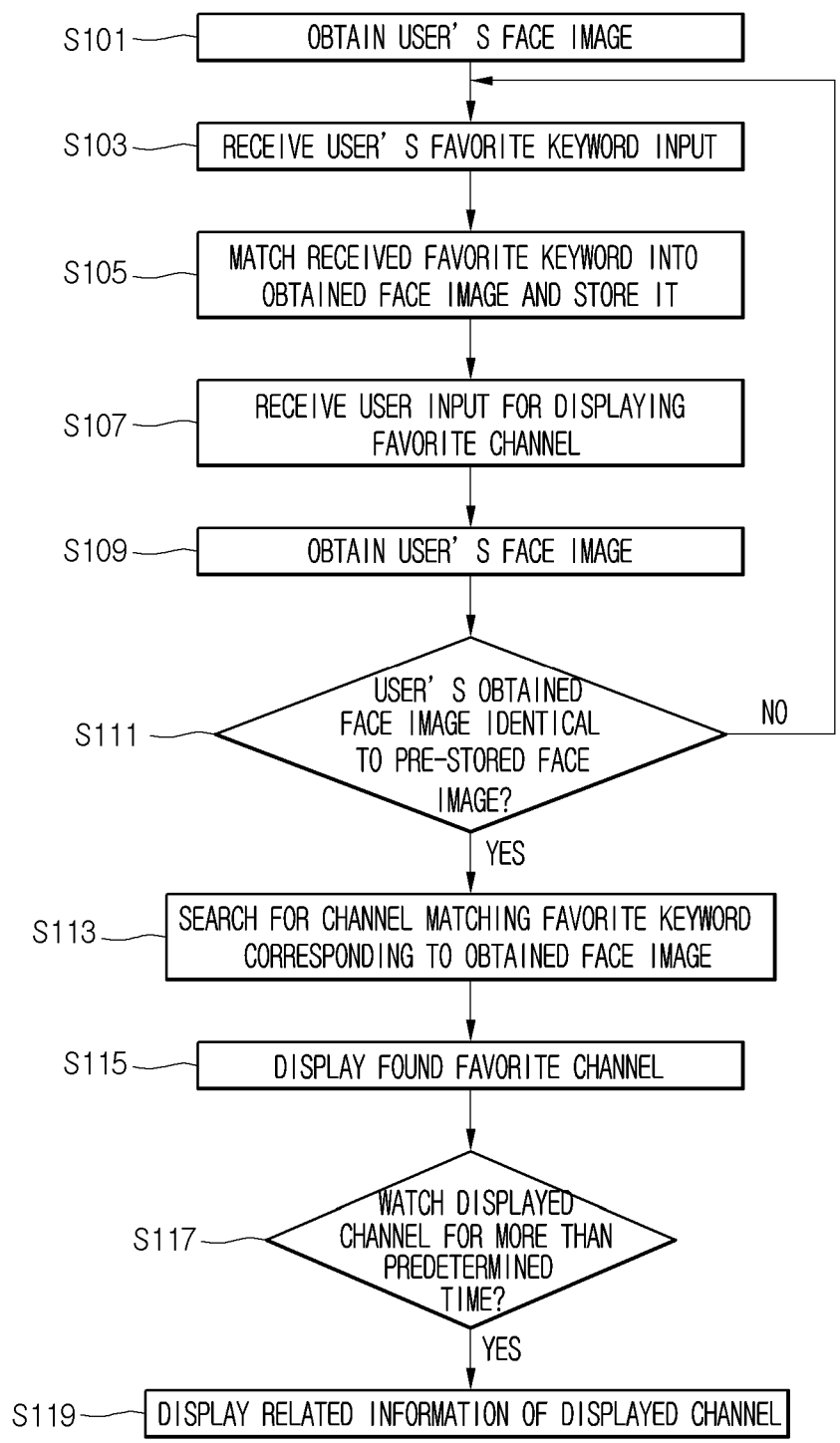
FIG. 4 is a flowchart illustrating an operating method of an video display device according to an embodiment of the present invention.

FIG. 4 is a flowchart illustrating an operating method of the video display device 100 according to an embodiment of the present invention.

Referring to FIG. 4, the image acquisition unit 160 of the video display device 100 obtains a user's face image in operation S101.

The image acquisition unit 160 may obtain an image for the user through a camera included in the image acquisition unit 160. Then, the control unit 170 may obtain a user's face image from the obtained image for the user.

Figure 5:
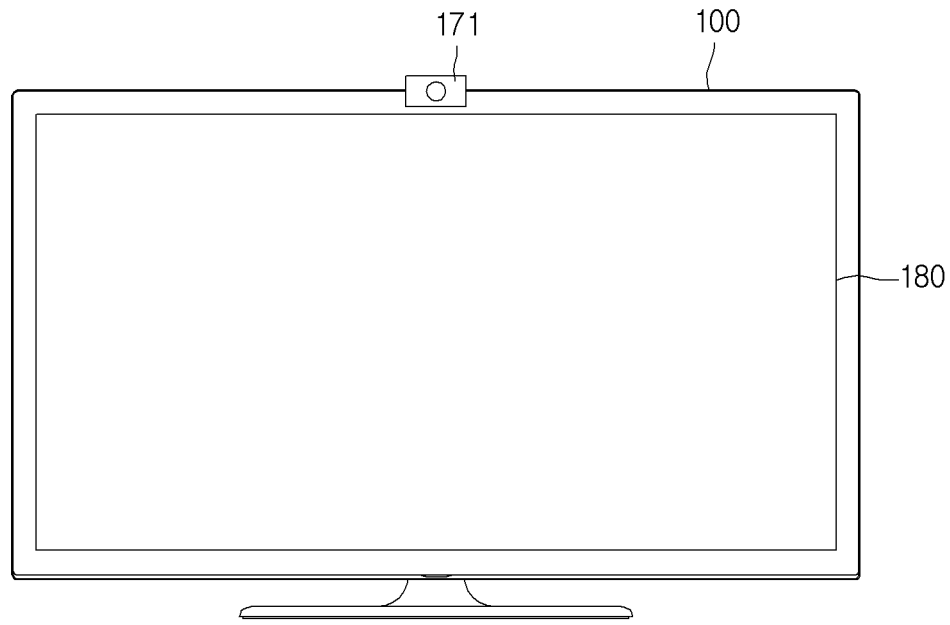
FIG. 5 is a view illustrating an image acquisition of an image acquisition unit according to an embodiment of the present invention.

Referring to FIG. 5, a user's face image acquisition of the image acquisition unit 160 according to an embodiment of the present invention will be described.

FIG. 5 is a view illustrating an image acquisition of the image acquisition unit 160 according to an embodiment of the present invention.

Figure 6:
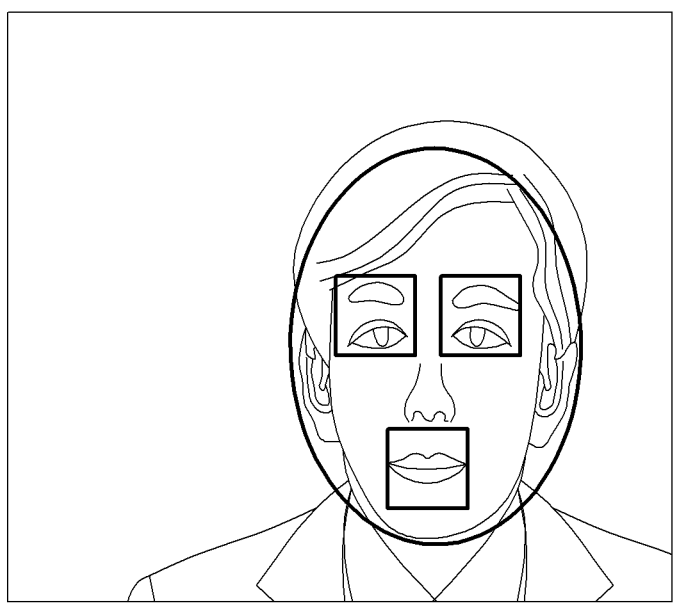
FIG. 6 is a view illustrating a user's face image acquisition of a control unit according to an embodiment of the present invention.

Referring to FIG. 6, the image acquisition unit 160 may be equipped at the front of the video display device 100 so as to obtain an image. Accordingly, the image acquisition unit 160 may obtain an image for a user using the video display device 100.

According to an embodiment of the present invention, the image acquisition unit 160 may obtain an image for a user through a camera equipped at the front of the video display device 100. Then, the image acquisition unit 160 delivers the obtained image for the user to the control unit 170. The control unit 170 may obtain a user's face image from the obtained mage for the user.

Referring to FIG. 6, a user's face image acquisition of the control unit 170 will be described.

FIG. 6 is a view illustrating a user's face image acquisition of the control unit 170 according to an embodiment of the present invention.

Referring to FIG. 6, the control unit 170 may recognize the user's face from the obtained image for the user. Accordingly, the control unit 170 may obtain a face image for the recognized user's face by recognizing the user's face.

Herein, a technique of the control unit 170 for the user's face recognition is a known technique and may be set diversely according to a selection of a user or a designer.

Hereinafter, FIG. 4 will be described again.

Referring to FIG. 4, the video display device 100 receives a user's favorite keyword in operation S103.

The video display device 100 may receive a favorite keyword from a user corresponding to an obtained face image.

In more detail, the video display device 100 may receive at least one favorite keyword from a user through the user input interface unit 150.

According to an embodiment of the present invention, the video display device 100 may receive a user's favorite keyword through the user input unit 235.

Herein, the favorite keyword that a user inputs may include at least one of favorite channels, favorite broadcasting stations, actor names, favorite singers, favorite programs, favorite contents, favorite areas, favorite genres, and the favorite sports.

For example, the video display device 100 may receive CNN, baseball, education, and channel 24 as a favorite keyword from a user.

As another example, the video display device 100 may receive Rolling Stones, news, economy, climbing, and movies as a favorite keyword from a user.

As examples for describing the favorite keyword input reception of the video display device 100, various favorite keywords may be received.

Moreover, the video display device 100 may add a favorite keyword for a user on the basis of a user's usage pattern of the video display device 100.

In more detail, the control unit 170 of the video display device 100 may add a favorite keyword for user on the basis of at least one of a search keyword that a user inputs for the video display device 100, a channel viewed through the video display device 100, and information on an application executed on the video display device 100.

According to an embodiment of the present invention, when a user inputs a specific search keyword for the video display device 100 for more than a predetermined number, the control unit 170 may add the inputted specific search keyword as a favorite keyword with respect to the user.

As another embodiment of the present invention, when a user watches a specific channel for more than a predetermined time through the video display device 100, the control unit 170 may add the watching specific channel as a favorite keyword with respect to the user.

As another embodiment of the present invention, when a user executes a specific channel for more than a predetermined number in the video display device 100, the control unit 170 may add at least one of the name, type, and the publisher of the executed application as a favorite keyword with respect to the user.

The video display device 100 matches the received favorite keyword to the obtained user's face image and then stores it in operation S105.

The video display device 100 may match the user's face image obtained in operation S101 to the user's favorite keyword received in operation S103 and may then store it in the database of the storage unit 140.

The video display device 100 may match the user's face image obtained in operation S101 to the user's favorite keyword received in operation S103 and may then store it in the database of the storage unit 140.

The video display device 100 may receive a User input for displaying a favorite channel in operation S107.

The video display device 100 may receive a user input for displaying a favorite channel from a user through the input interface unit 150.

Herein, the user input for displaying a favorite channel may include at least one of a user input for favorite channel display and a user input for channel switching.

According to an embodiment of the present invention, the video display device 100 may receive a user input for displaying a favorite channel through a user input for the favorite channel button 295.

As another embodiment, the video display device 100 may receive a user's channel switching input as a user input for displaying a favorite channel. In more detail, the video display device 100 may receive a user input for the channel button 293 as a user input for displaying a favorite channel. Accordingly, the video display device 100 may switch a channel displayed on the display unit 180 as one of at least one favorite channel on the basis of the user's channel switching input.

As another embodiment, the video display device 100 may operate by dividing a user's channel switching input into a user input for displaying a favorite channel and a user input for general channel switching on the basis of at least one of an input time and an input intensity of the user's channel switching input. According to an embodiment of the present invention, the video display device 100 may display a favorite channel according to a user input pressing a channel switching button for more than a predetermined time and may perform a general channel switching operation according to a user input pressing a channel switching button for less than a predetermined time. According to an embodiment of the present invention, the video display device 100 may display a favorite channel according to a user input pressing a channel switching button for more than a predetermined intensity and may perform a general channel switching operation according to a user input pressing a channel switching button for less than a predetermined intensity.

The video display device 100 obtains a user's face image thereof in operation S109.

Furthermore, the video display device 100 may obtain a user's face image displayed on the video display device 100 through the image acquisition unit 160.

In more detail, the video display device 100 may obtain an image for a user through a camera included in the image acquisition unit 160. Then, the control unit 170 of the video display device 100 may recognize a user's face from the obtained image for the user. The control unit 170 may obtain a user's face image corresponding to the user's face recognized from the obtained mage for the user.

Additionally, the control unit 170 may obtain respective user's face images correspond to a plurality of users from the obtained image for the user. Accordingly, when the image acquisition unit 160 obtains an image including a plurality of users, the control unit 170 may obtain the respective face images of the plurality of users from the obtained image.

Figure 7:
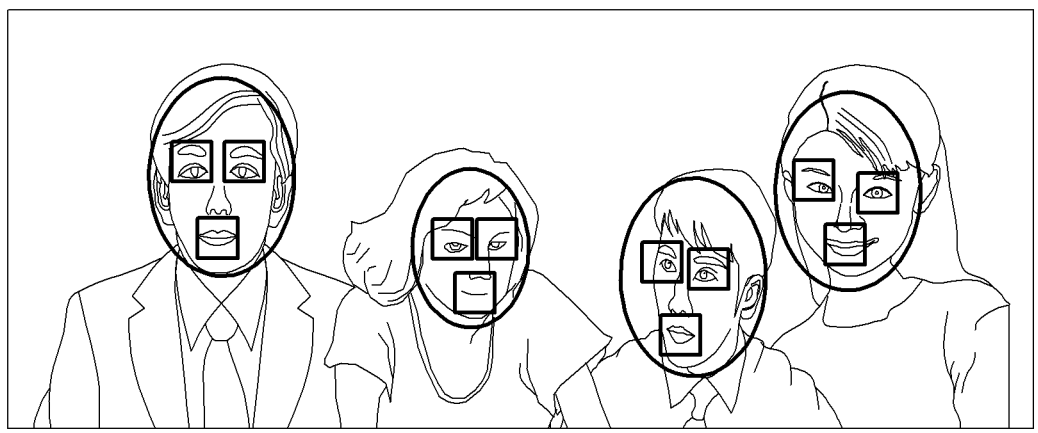
FIG. 7 is a view illustrating a control unit obtaining a plurality of user's face images according to an embodiment of the present invention.

Referring to FIG. 7, the control unit 170 obtaining face images of a plurality of users will be described.

FIG. 7 is a view illustrating the control unit 170 obtaining face images of a plurality of users according to an embodiment of the present invention.

Referring to FIG. 7, the control unit 170 may recognize respective user's faces from an obtained image for a user. Accordingly, the control unit 170 may recognize the plurality of user's faces and may then obtain respective face images for the plurality of recognized user's faces.

The video display device 100 determines whether the obtained user's face image is identical to a pre-stored user's face image in operation S113.

The control unit 170 of the video display device 100 may compare the user's face image obtained in operation S109 with at least one user's face image stored in the database of the storage unit 140. Accordingly, the control unit 170 may perform a search to determine whether a user's face image identical to the user's face image obtained in operation S109 is stored in the database of the storage unit 140.

Additionally, when the user's face image obtained in operation S109 is one of the plurality of user's face images, the control unit 170 may compare each of the plurality of user's face images with at least one user's face stored in the database of the storage unit 140. Thus, the control unit 170 may determine whether a user's face image identical to each of the plurality of user's face images obtained in operation S109 is stored in the database of the storage unit 140.

When the obtained user's face image is identical to a pre-stored user's face image, the video display device 100 searches for a favorite channel matching a favorite keyword corresponding to the obtained user's face image in operation S113.

The control unit 170 of the video display device 100 may search for a favorite channel matching a favorite keyword on the basis of the favorite keyword matched to the determined user's face image and stored.

According to an embodiment of the present invention, when the determined user's face image is the face image of a user A, the control unit 170 may search for a favorite channel matching a favorite keyword that the user A pre-registers. Accordingly, when the favorite keyword of the user A is BBC, football, news, and Madonna, the control unit 170 may search for a channel matching the favorite keyword from a plurality of channels that the video display device 100 displays. Since the control unit 170 searches for a channel corresponding to each favorite keyword, it may search for a channel relating to the BBC broadcasting station matching the BBC, a channel relating to football, a channel relating to news, and a channel relating to Madonna.

The control unit 170 may search for a channel matching the favorite channel on the basis of at least one of electronic program guide (EPG) information, channel information through internet, auto content recognition, and data broadcast.

According to an embodiment of the present invention, the control unit 170 may search for a channel matching the favorite keyword on the basis of the name of a channel being broadcasted, the title of a program, contents, cast, and production staffs through EPG information.

As another embodiment, the control unit 170 may receive channel information through internet and may then search for a channel matching the favorite keyword on the basis of the received channel information.

As another embodiment, the control unit 170 may automatically recognize an image or audio of a program being broadcasted through auto content recognition and may then search for a channel matching the favorite keyword on the basis of the recognized contents. In more detail, the control unit 170 may automatically recognize at least one of an image and audio of a program being broadcasted. The control unit 170 may search for an object of the recognized image and may determine a channel matches the favorite keyword on the bases of the search result. Additionally, the control unit 170 may search for information on the recognized audio and may determine a channel matches the favorite keyword on the bases of the search result. An auto content recognition technique is a known technique and thus its detailed description will be omitted.

Moreover, as mentioned above, the control unit 170 may search for a channel matching the favorite keyword among entire channels.

Additionally, the control unit 170 may determine whether the previous/next channel of a currently displayed channel matches the favorite keyword on the basis of information on the previous/next channel of the currently displayed channel. In more detail, the control unit 170 may determine whether each of channels within a predetermined range matches the favorite keyword on the basis of information on channels within a predetermined range of a currently displayed channel. Accordingly, the control unit 170 may not perform a search to determine whether entire channels match the favorite keyword and may determine whether each of channels within a predetermined range of a currently displayed channel matches the favorite keyword. Thus, in correspondence to a user's channel switching input, the control unit 170 may switch a currently displayed channel into a channel matching the favorite channel. This will be described later.

Then, the control unit 170 may search for contents and application matching the user's favorite keyword. In more detail, the control unit 170 may search for contents and application matching the user's favorite keyword from at least one of at least one executable application and at least one playable content.

Moreover, when there is a pre-stored user's face image identical to each of a plurality of obtained user's face images, the control unit 170 may search for favorite channels matching a plurality of favorite keywords that the plurality of users input before.

According to an embodiment of the present invention, the control unit 170 may search for a favorite channel matching at least one overlapping favorite keyword from a plurality of favorite keywords that a plurality of users input before. For example, when a favorite keyword that a user A inputs includes climbing, cooking, and infinity challenge and a favorite keyword that a user B inputs includes baseball, climbing, and 1 night 2 days, the control unit 170 may search for a favorite channel matching climbing, i.e., the overlapping favorite keyword.

As another example, the control unit 170 may display a favorite keyword of each of a plurality of users and may receive an input for selecting one from the plurality of users from a user. Then, the control unit 170 may search for a favorite channel matching a favorite keyword for a user corresponding to the received input. This will be described with reference to FIG. 8.

Figure 8:
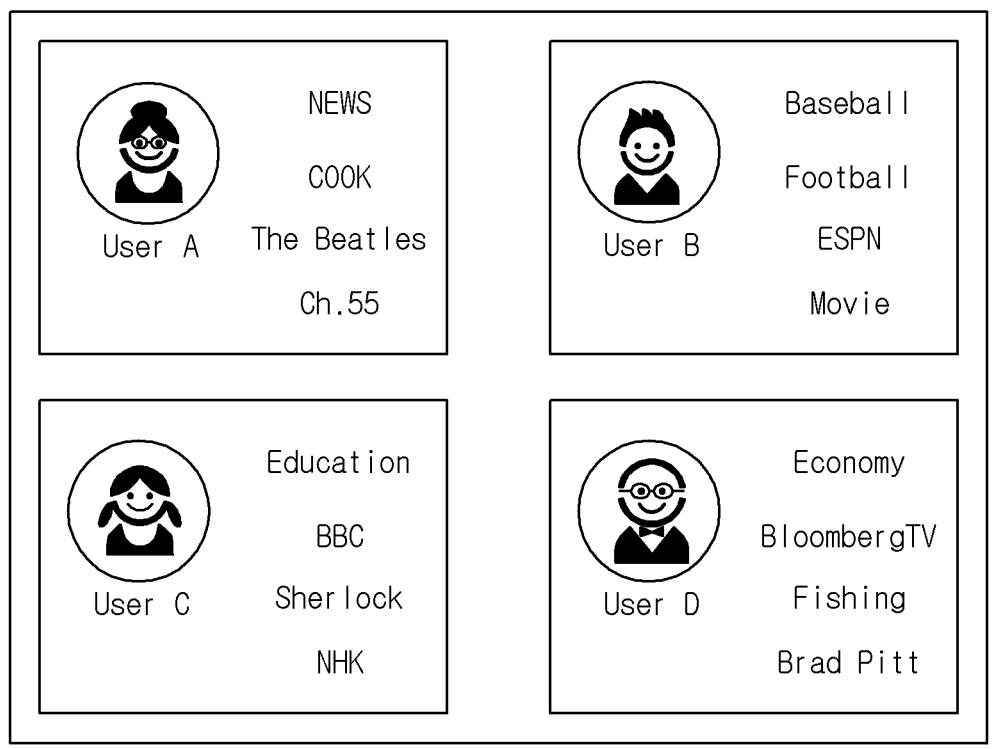
FIG. 8 is a view illustrating a user keyword selection screen according to an embodiment of the present invention.

FIG. 8 is a view illustrating a user keyword selection screen according to an embodiment of the present invention.

Referring to FIG. 8, the control unit 170 may display on the display unit 180 the face image, name, and favorite keyword of each of a plurality of users with respect to a plurality of found users. Then, the control unit 170 may receive an input for selecting a favorite keyword for one of the plurality of users. Accordingly, the control unit 170 may search for a favorite channel matching a favorite keyword on the basis of the favorite keyword for a user corresponding to the received input. For example, as shown in FIG. 8, upon the receipt of an input that a user selects a user B, the control unit 170 may search for a favorite channel matching baseball, football, ESPN, and move, that is, the favorite keyword corresponding to the user B.

Moreover, the control unit 170 may search for a favorite channel matching the favorite keyword at each predetermined time and may update a favorite channel list.

Moreover, the control unit 170 may search for a favorite channel matching the favorite keyword each time EPG information is updated and may then update the favorite channel list.

Moreover, the control unit 170 may search for a favorite channel matching the favorite keyword each time a channel switching input is received and may then update the favorite channel list.

Hereinafter, FIG. 4 will be referred again.

Referring to FIG. 4, the video display device 100 displays the found favorite channel in operation S115.

The control unit 170 of the video display device 100 may display the found favorite channel on the display unit 180.

This will be described with reference to FIGS. 9 and 11.

Figure 9:
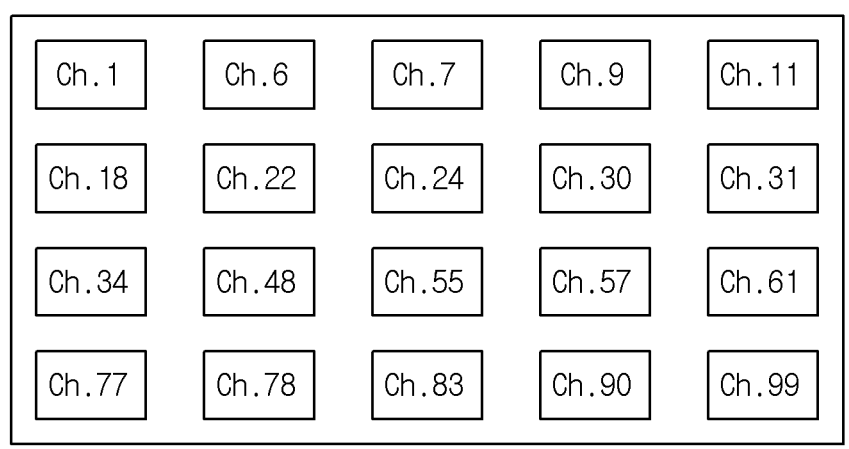
Figure 10:
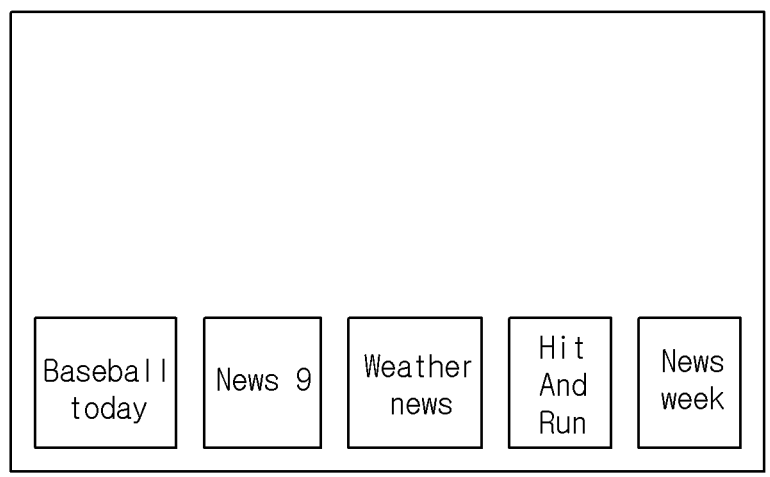

FIGS. 9 to 11 are views illustrating a favorite channel display according to an embodiment of the present invention.

According to an embodiment of the present invention, referring to FIG. 9, the control unit 170 may display the found favorite channel as a thumbnail image on the display unit 180. In more detail, the control unit 170 may display a thumbnail image for each of the plurality of found favorite channels on the display unit 180.

As another embodiment of the present invention, referring to FIG. 10, the control unit 170 may display a thumbnail image for each of a plurality of favorite channels on part of an entire screen of the display unit 180.

As another embodiment, referring to FIG. 11, the control unit 170 may display the found favorite channel as a channel list form on the display unit 180. In more detail, the control unit 170 may display on the display unit 180 at least one of a matching favorite keyword, channel information, and a program title with respect to each of the plurality of found favorite channels.

Moreover, the control unit 170 may arrange and display the found favorite channel.

In more detail, the control unit 170 may arrange a plurality of found favorite channels by each favorite keyword, genre, source, and user and may then display it on the display unit 180.

This will be described with reference to FIGS. 12 and 14.

Figure 13:
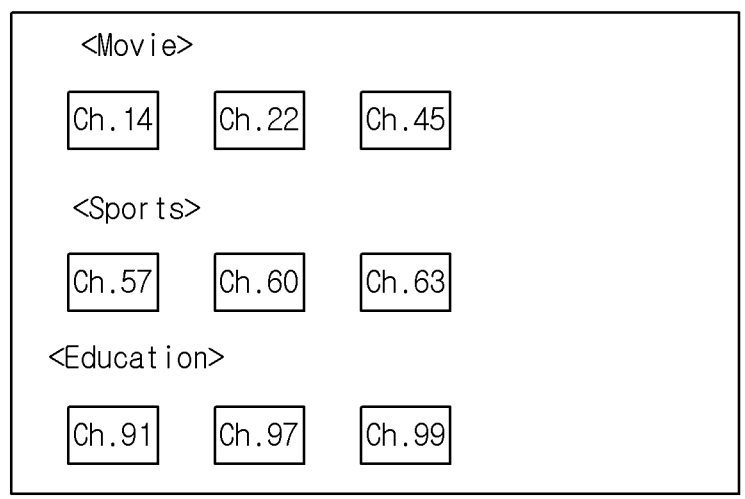
Figure 14:
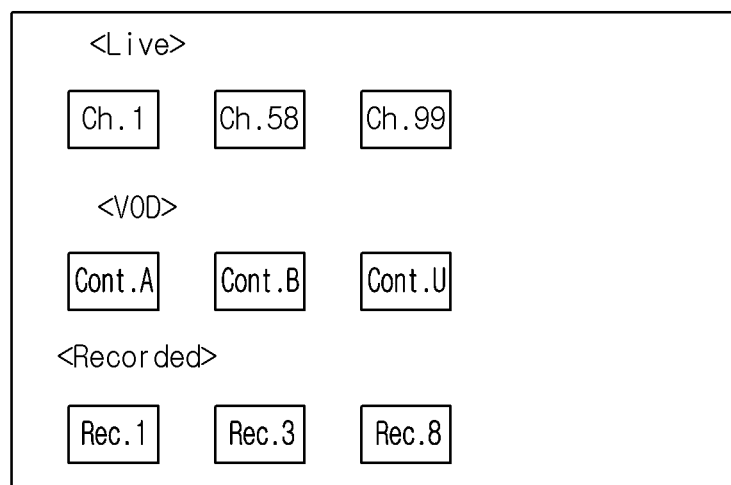

FIGS. 12 to 14 are views illustrating a favorite channel arrangement according to an embodiment of the present invention.

According to an embodiment of the present invention, referring to FIG. 12, the control unit 170 may arrange the plurality of found favorite channels by each favorite keyword and may then display them on the display unit 180.

As another embodiment, referring to FIG. 13, the control unit 170 may arrange the plurality of found favorite channels by each genre and may then display them on the display unit 180.

As another embodiment, referring to FIG. 14, the control unit 170 may arrange the plurality of found favorite channels by each source and may then display them on the display unit 180.

The above-mentioned favorite channel arrangement of the control unit 170 is just an example, and favorite channels may be arranged and displayed on the basis of various references according to a user's or designer's selection.

Moreover, the control unit 170 may display only a found favorite channel when a channel displayed on the display unit 180 switches according to a user's channel switching instruction input. Accordingly, the control unit 170 may display one of a plurality of favorite channels on the display unit 180 during channel switching and may not display a channel that is not the found favorite channel.

Moreover, the control unit 170 may display only a found favorite channel when a channel displayed on the display unit 180 switches according to a user's channel switching instruction input. In more detail, when a channel displayed on the display unit 180 switches more than a predetermined number according to a user's channel switching instruction, the control unit 170 may display an entire list of the found favorite channels. Then, the control unit 170 may switch the displayed channel into the selected channel by receiving a user input for selecting one channel from a list of the entire displayed favorite channels.

For example, as shown in FIG. 9, the control unit 170 may display on the display unit 180 the entire list of the found favorite channels in a thumbnail image form of each of the plurality of favorite channels. Then, the control unit 170 may switch a channel displayed as a selected channel into a selected channel by receiving a user input for selecting a thumbnail image for one of the entire list of the displayed favorite channels.

As another example, as shown in FIG. 11, the control unit 170 may display on the display unit 180 the entire list of the found favorite channel in a list form for the favorite keyword, channel information, and program title for each of the plurality of favorite channels. Then, the control unit 170 may receive a user input for selecting one channel from the entire list of the displayed favorite channel and may then switch the displayed channel into the selected channel.

As another example, the control unit 170 may display at least one of application and contents matching a user's favorite keyword on the list of found favorite channels.

Moreover, when a channel switches more than a predetermined number according to a user's channel switching instruction input, the control unit 170 may display a channel list of total channels. According to an embodiment of the present invention, when the channel displayed on the display unit 180 switches more than the predetermined number according to the user's channel switching instruction, the control unit 170 may display the channel list of the total channels.

Moreover, when the channel displayed on the display unit 180 switches more than the predetermined number according to the user's channel switching instruction, the control unit 170 may display a program list corresponding to the user's favorite keyword. According to an embodiment of the present invention, when the channel displayed on the display unit 180 switches more than the predetermined number according to the user's channel switching instruction, the control unit 170 may display a program list corresponding to the user's favorite keyword on the total channels. According to another embodiment of the present invention, when the channel displayed on the display unit 180 switches more than the predetermined number according to the user's channel switching instruction, the control unit 170 may display a program list corresponding to the user's favorite keyword on at least one found favorite channel. The above-mentioned total favorite channel list display of the control unit 170 is just an example and the total favorite channel list display may be set diversely according to a user's or designer's selection.

The video display device 100 may determine whether a user watches a displayed favorite channel for more than a predetermined time in operation S117.

The control unit 170 of the video display device 100 may determine whether a user watches a channel displayed on the display unit 180 for more than a predetermined time.

According to an embodiment of the present invention, the control unit 170 may obtain an image for a user through the image acquisition unit 160 and may determine whether a user watches a channel displayed on the display unit 180 for more than a predetermined time on the basis of the obtained image. For example, when the displayed favorite channel does not switch for more than a predetermined time and a user is recognized from an image obtained through the image acquisition unit 160, the control unit 170 may determine that a user watches the displayed favorite channel for more than a predetermined time.

As another embodiment, the control unit 170 determines whether a user watches a channel displayed on the display unit 180 for more than a predetermined time on the basis of channel switching. For example, when the displayed favorite channel does not switch for more than the predetermined time, the control unit 170 may determine that a user watches the displayed favorite channel for more than a predetermined time.

When it is determined that the user watches the displayed favorite channel for more than the predetermined time, the video display device 100 may display related information of the displayed favorite channel in operation S119.

When it is determined that the user watches the displayed favorite channel for more than the predetermined time, the control unit 170 of the video display device 100 may display the related information of the displayed favorite channel on an entire screen or a partial screen of the display unit 180.

Here, the related information of the favorite channel may include at least one of search words, blogs, contents, sites, and news corresponding to a favorite channel.

In more detail, the control unit 170 may search for the related information of the displayed favorite channel on the basis of one of a favorite keyword corresponding to the displayed favorite channel, EPG information, channel information through internet, information through auto content recognition, and data broadcast included in a digital broadcast signal. Then, the control unit 170 may display the found related information on a full screen or a partial screen of the display unit 180.

According to an embodiment of the present invention, the control unit 170 may display the result found through internet search on a favorite keyword on a partial screen of the display unit 180.

As another embodiment, the control unit 170 may obtain information on a favorite channel on the basis of data broadcast included in a digital broadcast signal and may collect related information on the obtained information and may then display it on the display unit 180.

Accordingly, the control unit 170 may display the related information of the favorite channel on a favorite channel screen being displayed.

An embodiment for this will be described with reference to FIG. 15.

FIG. 15 is a view illustrating a related information display screen for a favorite channel according to an embodiment of the present invention.

Referring to FIG. 15, the control unit 170 may display related information on a cooking channel, that is, a favorite channel being displayed, on a screen of the cooking channel. In more detail, the control unit 170 may obtain related information on making a cheeseburger, that is, a program being broadcasted in a cooking channel, through the above-mentioned process. Then, the control unit 170 may display the obtained related information on making a cheeseburger on the display unit 180. Accordingly, as shown in FIG. 15, the control unit 170 may display a recipe on making a cheeseburger on a partial screen. The control unit 170 may display a contents list for cooking, that is, a favorite keyword corresponding to a cooking channel, on a partial screen. Additionally, the control unit 170 may search for a popular blog for cooking, that is, a favorite keyword, and may then display the found blog screen on a partial screen. Additionally, the control unit 170 may display a webpage link of a related shopping mall for cooking, that is, a favorite keyword, on a partial screen.

Additionally, after displaying related information of a favorite channel displayed when a user watches the displayed channel for more than a predetermined time, even when the displayed favorite channel switches, the control unit 170 may continuously display related information on a favorite channel before switching.

According to an embodiment of the present invention, when a user watches a displayed favorite channel A for more than a predetermined time, the control unit 170 may display related information on the channel A. The control unit 170 may change a channel displayed on the display unit from a channel A into a channel B by receiving a user's channel switching input. The control unit 170 may display the switched channel B on a full screen and may display related information of the channel A on a partial screen. Moreover, the video display device 100 may display related information of a channel displayed depending on a user's channel switching input, according to a user's or designer's setting. In more detail, the video display device 100 may receive a user's channel switching input and may then display related information of a channel displayed on the display unit 180. Here, channel switching may include channel switching between general channels in addition to channel switching between favorite channels.

The above-mentioned related information display of a favorite channel is just an example and may be applied diversely according to a user's or designer's selection.

Moreover, when it is determined that a user's face image obtained in operation S111 is not identical to a pre-stored user's face image, the video display device 100 proceeds to operation S103. Accordingly, the video display device 100 receives a user's favorite keyword input in operation S103 and matches the received favorite keyword to the obtained user's face image and then stores it in operation S105. Then, the video display device 100 may repeat the above process. Detailed contents for this are described above.

According to various embodiments of the present invention, the present invention may search for a favorite channel on the basis of a favorite keyword that a user inputs and may provide the found favorite channel to a user.

Additionally, the present invention recognizes a user's face and provides a favorite channel matching a favorite keyword that the recognized user inputs, so that the favorite channel may be easily provided to a user.

According to an embodiment of the present invention, the above method may be implemented on a program recorded medium as processor readable code. Examples of the processor readable medium may be ROM, RAM, CD-ROM, magnetic tape, floppy disk, and optical data storage devices and also may be implemented in a form of a carrier wave (for example, transmission through Internet).

In relation to the above-described video display device, the configurations and methods of the above-described embodiments are applied without limitations and in order to provide various modifications, some or all of embodiments may be selectively combined and configured.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An operating method of a video display device the method comprising:

when a specific search keyword is inputted by a specific user for more than a predetermined number, adding via a control unit the specific search keyword to favorite keywords corresponding to the specific user;

obtaining, via an image acquisition unit, a user's face image of the video display device;

determining, via a control unit, whether the obtained user's face image is identical to one face image among at least one pre-stored user's face image;

when the obtained user's face image is identical to the pre-stored user's face image, searching, via the control unit, for at least one favorite channel matching at least one favorite keyword corresponding to the pre-stored user's face image, wherein the at least one favorite keyword is pre-registered in a storage unit and the pre-registered favorite keyword is matched to the pre-stored user's face image;

displaying the at least one favorite channel on a display unit;

determining, via the control unit, whether the user watches a displayed favorite channel for more than a predetermined time; and when the displayed favorite channel does not switch for more than a predetermined time and the user is recognized from an image which the video display device obtains, displaying related information of the displayed favorite channel on the display unit, wherein the searching for the at least one favorite channel matching the at least one favorite keyword corresponding to the pre-stored user's face image comprises:

if a face image for a plurality of users is obtained and each face image of the plurality of users is identical to the pre-stored user's face image, searching for a favorite channel matching an overlapping favorite keyword from respective favorite keywords corresponding to the plurality of user's face images, wherein the displaying the at least one favorite channel comprises:
receiving a channel switching input;
switching a channel displayed on the video display device according to the channel switching input; and
when the channel displayed on the video display device switches more than a predetermined number according to the channel switching input of the user, displaying an entire list of the at least one favorite channel, and
wherein the related information comprises at least one of search word information for a favorite keyword corresponding to the displayed favorite channel, blog information, site information, and news information.

2. The method according to claim 1, wherein the obtaining of the user's face image comprises:
obtaining an image for a user of the video display device;
recognizing a face of the user from the obtained image for the user; and
obtaining a face image of the recognized user.

3. The method according to claim 1, wherein the determining of whether the obtained user's face image is identical to the at least one pre-stored user's face image comprises:
searching for the pre-stored user's face image;
comparing the found user's face image with the obtained user's face image; and
determining whether the obtained user's face image is identical to the found user's face image on the basis of a comparison result.

4. The method according to claim 1, wherein the searching for the at least one favorite channel matching the at least one favorite keyword comprises:
loading a favorite keyword corresponding to the pre-stored user's face image; and
searching for a favorite channel matching the loaded favorite keyword.

5. The method according to claim 4, wherein the searching for the favorite channel matching the loaded favorite keyword comprises searching for a favorite channel matching the loaded favorite keyword on the basis of at least one of electronic program guide (EPG) information that the video display device receives, channel information through internet, information through auto content recognition, and information through data broadcast.

6. The method according to claim 1, wherein the determining of whether the obtained user's face image is identical to the pre-stored user's face image comprises:
determining whether the obtained user's face image includes the face image for the plurality of users; and
when the obtained user's face image includes the face image for the plurality of users, determining whether each face image of the plurality of users is identical to the pre-stored user's face image.

7. The method according to claim 6, wherein the searching for the at least one favorite channel matching the at least one favorite keyword comprises:
when each of the plurality of user's face images is identical to the pre-stored user's face image, receiving an input for selecting one user from the plurality of users; and
searching for a favorite channel matching a favorite keyword corresponding to the selected user.

8. The method according to claim 1, further comprising receiving a user input for registering the at least one favorite keyword.

9. The method according to claim 8, wherein the receiving of the user input for registering the at least one favorite keyword comprises:
obtaining a user's face image of the video display device;
receiving a favorite keyword input of the user; and
matching the received favorite keyword to the obtained user's face image and storing it.

10. The method according to claim 1, wherein the entire list arranges and displays the at least one favorite channel on the basis of one of the at least one favorite keyword, a genre of the at least one favorite channel, and a source.

11. The method according to claim 1, wherein displaying the at least one favorite channel comprises receiving a user input to display the at least one favorite channel.

12. The method according to claim 1, wherein the searching for the at least one favorite channel matching the at least one favorite keyword comprises, when a predetermined time elapses or new EPG information is received, searching for at least one favorite channel matching the at least one favorite keyword.

13. An video display device comprising:
a display unit;
an image acquisition unit obtaining an image for a user of the video display device; and
a control unit adding a specific search keyword to favorite keywords corresponding to a specific user when the specific search keyword is inputted by the specific user for more than a predetermined number, obtaining a user's face image of the video display device, determining whether the obtained user's face image is identical to one face image among at least one pre-stored user's face image; when the obtained user's face image is identical to the pre-stored user's face image, searching for at least one favorite channel matching at least one favorite keyword corresponding to the pre-stored user's face image, displaying the at least one favorite channel, determining whether the user watches a displayed favorite channel for more than a predetermined time and displaying related information of the displayed favorite channel when the displayed favorite channel does not switch for more than a predetermined time and the user is recognized from an image which the image acquisition unit obtains,
wherein the at least one, favorite keyword is pre-registered in a storage unit and the pre-registered favorite keyword is matched to the pre-stored user's face image,
wherein the control unit, if a face image for a plurality of users is obtained and each face image of the plurality of users is identical to the pre-stored user's face image, searches for a favorite channel matching an overlapping favorite keyword from respective favorite keywords corresponding to the plurality of user's face images,
wherein the control unit receives a channel switching input, switches a channel displayed on the video display device according to the channel switching input, and displays an entire list of the at least one favorite channel when the channel displayed on the video display device switches more than a predetermined number according to the channel switching input of the user, and
wherein the related information comprises at least one of search word information on a favorite keyword corresponding to the displayed favorite channel, blog information, site information, and news information.

14. The device according to claim 13, wherein the at least one favorite keyword is pre-registered in the storage unit by the control unit.

15. The method according to claim 1, wherein the receiving of the user input for displaying the favorite channel comprises:
    receiving the channel switching input; and
    determining whether the channel switching input is an input for general channel switching operation or an input for displaying the at least one favorite channel, on the basis of at least one of an input time and an input intensity of the channel switching input,
    wherein the displaying the at least one favorite channel comprises:
    displaying the at least one favorite channel if the channel switching input is the input for displaying the at least one favorite channel, and performing the general channel switching operation if the channel switching input is the input for general channel switching operation.

16. The method according to claim 1, wherein the received channel switching input includes a first input to switch the channel displayed on the video display device into a general channel and a second input to switch the channel displayed on the video display device into a favorite channel, and
    wherein the displaying the at least one favorite channel comprises:
    determining whether the received channel switching input is the first input or the second input, on the basis of an input intensity of the channel switching input, and
    displaying one of the at least one favorite channel if the received channel switching input is the second input.

\* \* \* \* \*